(12) United States Patent
Jeloka et al.

(10) Patent No.: US 12,223,010 B2
(45) Date of Patent: Feb. 11, 2025

(54) METHODS AND CIRCUITS OF SPATIAL ALIGNMENT

(71) Applicant: Arm Limited, Cambridge (GB)

(72) Inventors: Supreet Jeloka, Austin, TX (US);
Mudit Bhargava, Austin, TX (US);
Saurabh Pijuskumar Sinha, Schertz, TX (US); Rahul Mathur, Austin, TX (US)

(73) Assignee: Arm Limited, Cambridge (GB)

( * ) Notice: Subject to any disclaimer, the term of this patent is extended or adjusted under 35 U.S.C. 154(b) by 652 days.

(21) Appl. No.: 17/339,895

(22) Filed: Jun. 4, 2021

(65) Prior Publication Data

US 2022/0391469 A1     Dec. 8, 2022

(51) Int. Cl.
*G06F 17/16* (2006.01)
*G06F 9/30* (2018.01)

(52) U.S. Cl.
CPC .......... *G06F 17/16* (2013.01); *G06F 9/30014* (2013.01); *G06F 9/30036* (2013.01); *G06F 9/30032* (2013.01)

(58) Field of Classification Search
CPC ... G06F 17/16; G06F 9/30014; G06F 9/30032
See application file for complete search history.

(56) References Cited

U.S. PATENT DOCUMENTS

| 10,942,843 B2 * | 3/2021 | Leidel ................ G06F 12/0223 |
| 2015/0199266 A1 * | 7/2015 | Franchetti ............... G06F 15/76 711/117 |
| 2021/0055966 A1 * | 2/2021 | Della Monica ......... G06F 3/064 |

* cited by examiner

*Primary Examiner* — Michael D. Yaary
(74) *Attorney, Agent, or Firm* — Pramudji Law Group PLLC; Ari Pramudji

(57) ABSTRACT

According to one implementation of the present disclosure, a method includes performing a spatial alignment of at least one of first or second data tiers of a circuit; and performing a computation based on the spatial alignment of the at least one of the first and second data tiers. According to another implementation of the present disclosure, a circuit includes: a compute circuitry; and at least first and second data tiers of two or more data tiers positioned at least partially overlapping one another. In an example, each of the at least first and second data tiers is coupled to the compute circuitry. In certain implementations, the positioning of the first and second data tiers at least partially overlapping one another corresponds to a spatial alignment.

19 Claims, 12 Drawing Sheets

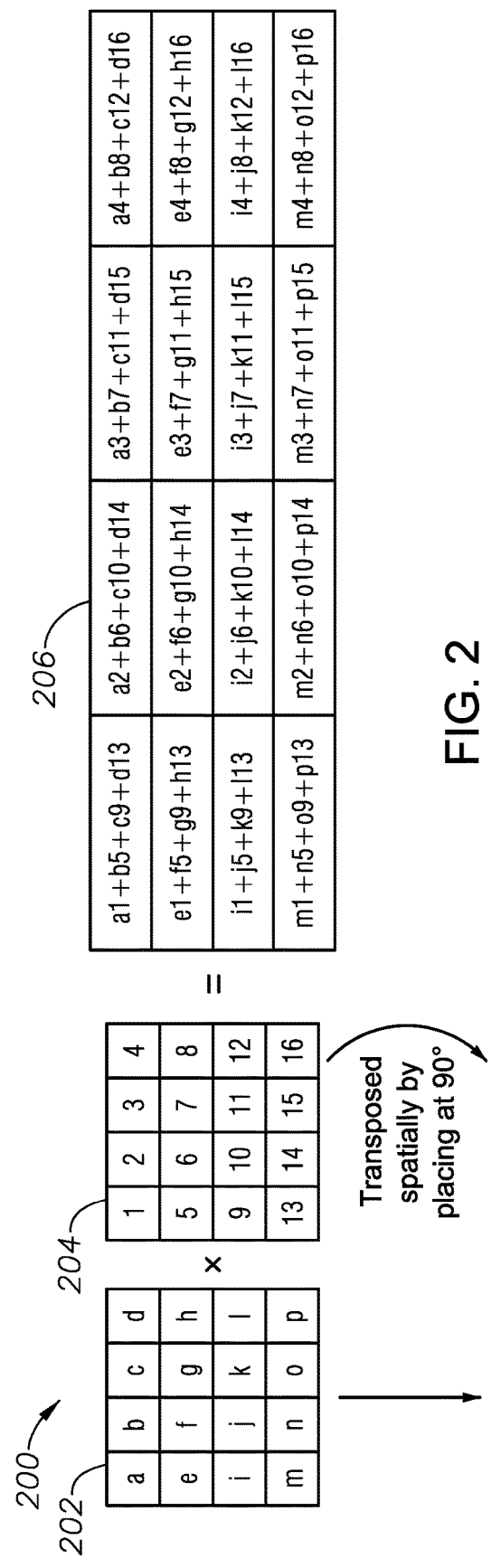
FIG. 2
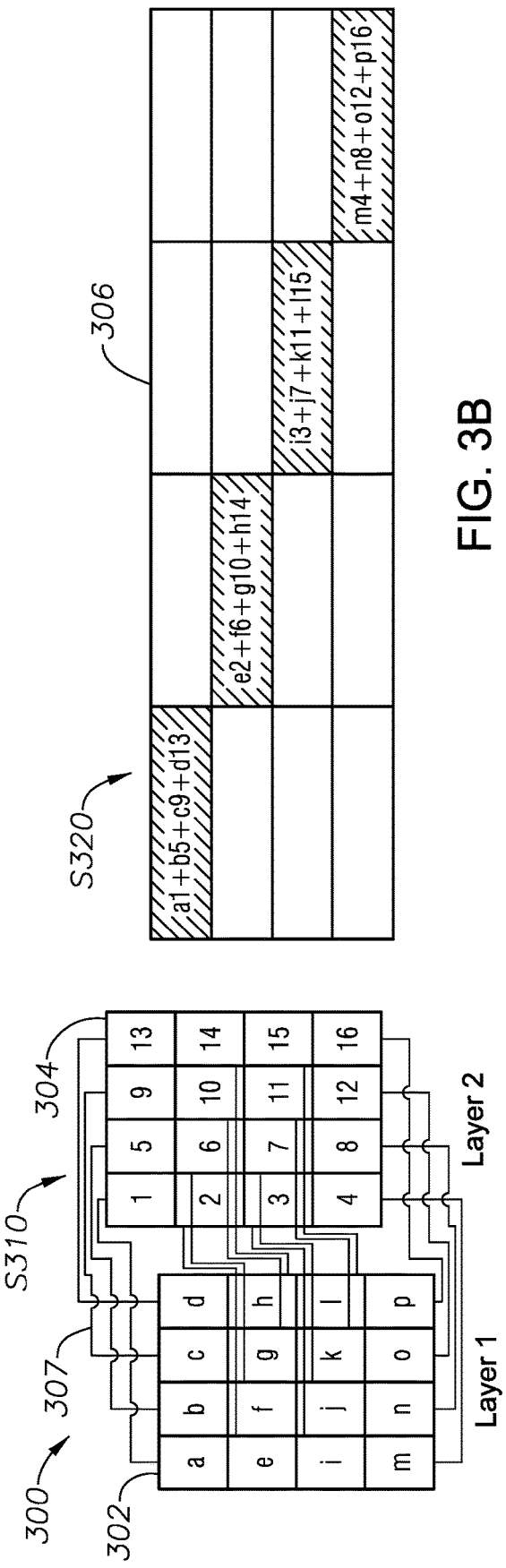
FIG. 3A
FIG. 3B

FIG. 3E

S320: a1+b5+c9+d13 | — | — | m1+n5+o9+p13
S340: a2+b6+c10+d14 | e2+f6+g10+h14 | — | —
(third column): — | e3+f7+g11+h15 | i3+j7+k11+l15 | —
(fourth column): — | — | i4+j8+k12+l16 | m4+n8+o12+p16

For 2 NxN Matrix After N cycles

| a1+b5 | b6+c10 | c11+d15 | d16+a4 |
|---|---|---|---|
| f5+g9 | g10+h14 | h15+e3 | e4+f8 |
| k9+l13 | l14+i2 | i3+j7 | j8+k12 |
| p13+m1 | m2+n6 | n7+o11 | o12+p16 |

| a1+b5+c9+d13 | a2+b6+c10+d14 | a3+b7+c11+d15 | a4+b8+c12+d16 |
|---|---|---|---|
| e1+f5+g9+h13 | e2+f6+g10+h14 | e3+f7+g11+h15 | e4+f8+g12+h16 |
| i1+j5+k9+l13 | i2+j6+k10+l14 | i3+j7+k11+l15 | i4+j8+k12+l16 |
| m1+n5+o9+p13 | m2+n6+o10+p14 | m3+n7+o11+p15 | m4+n8+o12+p16 |

S680 → / 610

For 2 NxN Matrix After N cycles

FIG. 6E

METHODS AND CIRCUITS OF SPATIAL ALIGNMENT

I. FIELD

The present disclosure is generally related to circuits and methods optimized through spatial alignment.

II. DESCRIPTION OF RELATED ART

Advances in technology have resulted in smaller and more powerful computing devices. For example, a variety of personal computing devices, including wireless telephones, such as mobile and smart phones, gaming consoles, tablets and laptop computers are small, lightweight, and easily carried by users. These devices can communicate voice and data packets over wireless networks. Further, many such devices incorporate additional functionality, such as a digital still camera, a digital video camera, a digital recorder, and an audio file player. Also, such devices can process executable instructions, including software applications, such as a web browser application, that can be used to access the Internet. As such, these devices can include significant computing and networking capabilities. For such devices, there is an ever-increasing demand for greater performance efficiency in memory storage.

In one example for matrix multiplication operations, data is streamed from memory devices through a processing element array and multiplied. For two matrices, the data in a second matrix would have to be read column-wise, and thus requiring a transpose in software for any such matrix multiplication operation.

III. BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, circuits or apparatuses described herein.

FIG. 2 is a schematic diagram of a representation in accordance with various implementations described herein.

FIGS. 3A-3F are schematic diagrams of representations in accordance with various implementations described herein.

FIGS. 6A-6E are schematic diagrams of representations in accordance with various implementations described herein.

Figure 1:
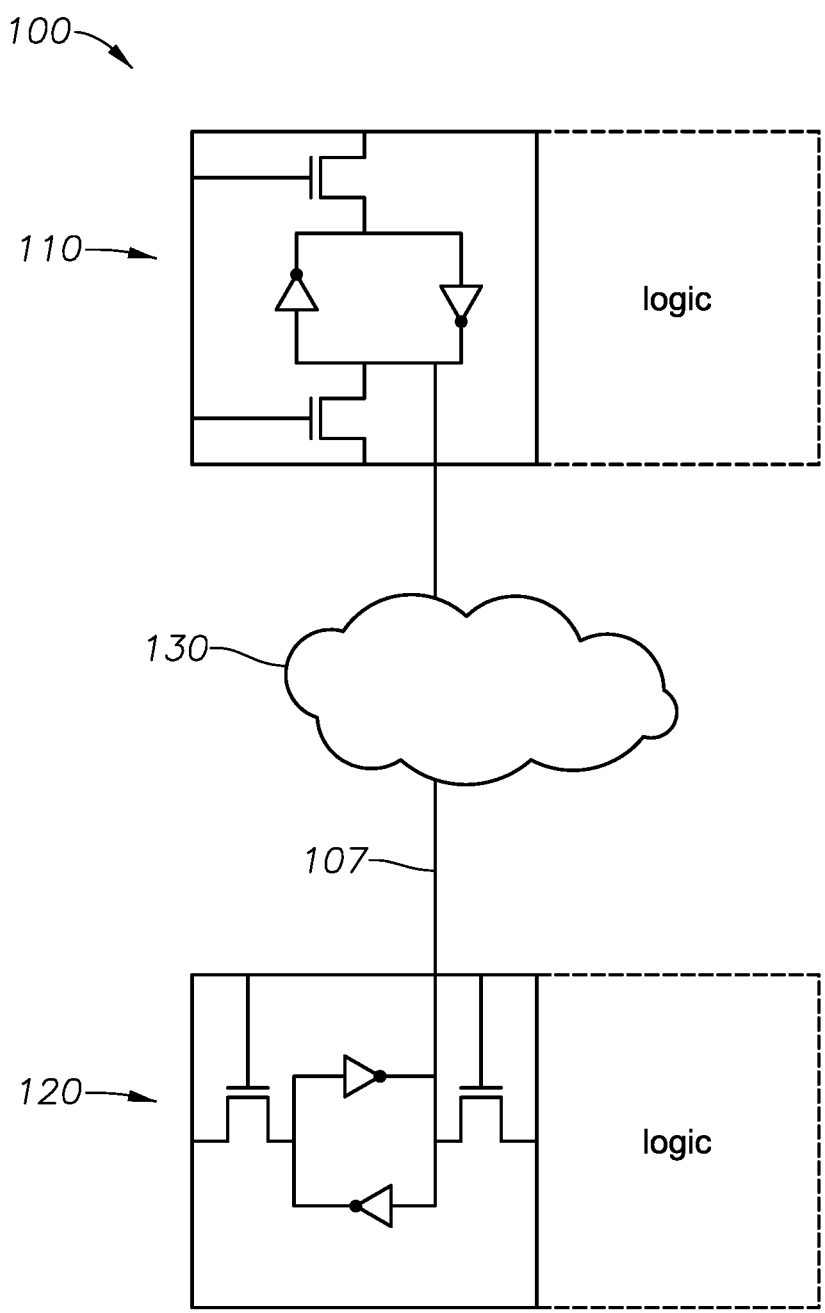
FIG. 1 is a schematic diagram of a portion of an example circuit in accordance with various implementations described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

IV. DETAILED DESCRIPTION

Particular implementations of the present disclosure are described below with reference to the drawings. In the description, common features are designated by common reference numbers throughout the drawings.

According to one implementation of the present disclosure, a method includes performing a spatial alignment of at least one of first or second data tiers (i.e., data layers) of a circuit; and performing a computation based on the spatial alignment of the at least one of the first and second data tiers.

According to one implementation of the present disclosure, a circuit includes: a compute circuitry; and at least first and second data layers of two or more data tiers positioned at least partially overlapping one another. In an example, each of the at least first and second data tiers is coupled to the compute circuitry. In certain implementations, the positioning of the first and second data tiers at least partially overlapping one another corresponds to a spatial alignment.

According to one implementation of the present disclosure, a computer-readable storage medium comprising instructions that, when executed by a processor, cause the processor to perform operations including: performing a spatial alignment of one or more of a first or second data tiers of a circuit; and performing a computation based on the spatial alignment of the one or more of the first and second data tiers.

Advantageously, inventive aspects of the present invention allow for the use of three-dimension (3D) connections to obtain a "free" matrix transpose in hardware and to provide minimal (low) data movement matrix multiplication. In such cases, such aspects leverage an additional dimension (i.e., the Z-direction) in a three-dimensional plane (i.e., an XYZ plane).

In certain schemes and techniques, as described herein, the inventive methods and circuits provide for a 3D transpose (as described with reference to FIGS. 3A-3F) and in-place matrix multiplication (as described with reference to FIGS. 6A-6E).

Referring to FIG. 1, at least an example portion of a circuit 100 (e.g., memory circuitry, circuit device) is shown. As illustrated, the circuit may include at least first and second data layers 110, 120 (i.e., first and second data tiers, first and second matrices) (e.g., first and second memories, buffers, latch, flip-flop etc.) on a respective first tier (e.g., top tier, upper tier) and second tier (e.g., bottom tier, lower tier), a compute circuitry 130 (e.g., a "compute cloud", wires, electrical coupling circuitry, compute logic), and an electrical connection 107 (i.e., electrical coupling, a 3D-connection). As depicted, the compute circuitry 130 may be located a particular tier or "in between" (i.e., any location where at least one tier is spatially above and another tier is spatially below the compute circuitry in a three-dimensional plane) the first and second data layers 110, 120. In certain implementations, the electrical connection may electrical couple the first and second data layers for matrix multiplication operations. In certain cases, each of the first and second data layers 110, 120 include N×N data element matrix, where N is a whole number of data elements. In certain examples, each data element of the data element matrix comprises one of at least one memory bit-cell (e.g., either single bitcells or multi-bitcells), at least one sequential logic or at least one state holding element (e.g., a flip-flop, latch). In various cases, for example, each data element can represent a digital data value (e.g., a "1" or a "0").

In one example, as part of a three-dimension (3D) integration, the first and second data tiers 110, 120 may be positioned at least partially overlapping one another, such that one or more of the data tiers can be spatially aligned/transformed (e.g., a transpose operation of a "flip" of a matrix over its diagonal (e.g., Aij to Aji))—i.e., spatial rotation (e.g., rotation at 90°) of one data tier from its original orientation, and subsequently, rotating "up" one data tier for successive cycles (as described with reference to FIG. 3A-3F); shifting data elements by a row or column index number (e.g., shifting to the "left" for rows, or shifting "up" for columns), and subsequently, rotating "up" one data tier for successive cycles (as described with reference to FIG. 6A-6F). In various implementations, the spatial alignment of one or both of the data tiers 110, 120 can be at any other angle between 0 and 359° in a spatial Z-direction of a three-dimensional XYZ plane. In various other implementations (as described herein), a spatial alignment may include other rotation operation (e.g., shift up, down, left, right), rotation operation of 180°, 270°, etc.; a "flip" on Y-axis, X-axis, a slide operation, a convolution, or a sliding window.

In certain cases, the electrical connections 107 (i.e., 3D-interconnect) (e.g., wiring) may be configured to electrically couple the compute circuitry 130 to one data element (e.g., a, b, c, d, etc.) of the first data layer 110 to a corresponding data element (e.g., 1, 2, 3, 4, etc.) of the second data layer 120. Hence, each of the respective data elements on the first and second data layers, 110, 120 may be co-related to one another. In certain cases, the compute circuitry 130 may include circuitry for matrix multiplication (i.e., circuitry for multiplication (i.e., "multiplier") and addition (i.e., "adder") of data elements). Hence, the compute circuitry 130 can perform three-dimensional (3D) matrix multiplication.

In certain implementations, the compute circuitry 130 may be located on the first tier, the second tier or on a third tier, or inserted there-between. Also, logic and memory would also include a silicon tier. Nevertheless, in the Z-direction (i.e., Z-dimension) would include the 3D-interconnect 107.

Referring to FIGS. 2 and 3A-3F, a first implementation 200 and related methodology 300 of spatial alignment and matrix multiplication computation according to inventive aspects is shown. As an example, in the methodology, a first N×N matrix 202 (e.g., a first 4×4 matrix, as shown, includes 16 data elements (cells) from "a" to "p") may be spatially aligned to and matrix multiplied by a second N×N matrix 204 (e.g., a second 4×4 matrix, as shown, includes 16 data elements (cells) from "1" to "16"). After the spatial alignment and matrix multiply operation, the result is depicted as output matrix 206 (i.e., a result matrix). In certain implementations, the first N×N matrix 202 may correspond to the first data tier 110, and the second N×N matrix 204 may correspond to the second data tier 120.

As illustrated, FIGS. 3A-3F detail the example operation as represented in FIG. 2 in greater detail. As shown, FIGS. 3A-3F illustrate two 4×4 matrices 302, 304 (e.g., two N×N matrices). In certain implementations, the methodology 300 may be performed for any two or more N×N matrices, where N is a whole number and N multiplied by N would represent the total number of data elements per matrix (i.e., data layer), as well as the total number of "tiles" (i.e., boxes) of the result matrix. In some implementations, the first N×N matrix 302 may correspond to the first data layer 110, and the second N×N matrix 304 may correspond to the second data layer 120.

In FIG. 3A, in a first step 310 (S310), after placement (i.e., orientation) of a first N×N matrix of cells 302 (e.g., data elements 302*a*-302*p* corresponding to the first data layer 110 on a first tier), a second N×N matrix of cells 304 (e.g., data elements 304(1)-304(16) corresponding to the second data layer 120 on a second tier) can be spatially transformed (e.g., a 90° rotation) along an X-Y plane from an initial orientation (that matches the initial orientation of the first matrix 302). In doing so, for a three-dimensional (3D) circuit integration, the data elements of the second matrix N×N cells 302 would effectively "switch" its rows and columns (e.g., Aij to Aji). Thus, instead of a horizontal sequencing of the data elements, the data elements in FIG. 3A are transposed, and now ordered with vertical sequencing. Advantageously, by doing so, a "free" transpose would now also be realized in hardware, as there would be no requirement for an additional software or hardware transpose to "read" the resultant output products in the Y-direction.

As shown in FIG. 3A, upon the transpose of the second N×N matrix 302, one or more one-to-one connections 307 (i.e., one or more individual distinct connections, couplings, wirings) (e.g., 16 one-to-one connections) are provided between the first and second matrices 302, 304 so as to allow matrix multiply operations.

At step 320 (S320), as shown in FIGS. 3A-3B, as part of an example matrix multiply operation, each respective data element of a first row (e.g., a-d) of the first matrix 302 would be multiplied by a corresponding respective data element (e.g., 1, 5, 9, 13) of a first row of the second matrix 304. For instance, data element 302(*a*) would be multiplied by data element 304(1) to produce a first partial product "a1". Similarly, data element 302(*b*) would be multiplied by data element 304(5) to produce a second partial product "b5", and so on and so forth for each data element of the corresponding first rows of the first and second matrix. Upon generating all of the partial products of the combination of the first row of first matrix 302(*a-d*) with the first row of the second matrix 304(1, 5, 9, 13), each of the individual partial products are added together to generate a first output product (i.e., a first "set" of partial products, a first "tile"). As illustrated in FIG. 3B, as one example, the first output product of the result matrix 306 would be "a1+b5+c9+d13".

In continuation, with reference to FIGS. 3A-3B, data elements of the second row (e.g., e-h) of the first matrix 302 would be multiplied by a corresponding respective data element (e.g., 2, 6, 10, 14) of a second row of the second matrix 304. For instance, data element 302(*e*) would be multiplied by data element 304(2) to produce a first partial product "e2". Similarly, data element 302(*f*) would be multiplied by data element 304(6) to produce a second partial product "f6", and so on and so forth for each data element of the corresponding rows. Upon generating all of the partial products of the combination of the second row of first matrix 302(*e-h*) with the second row of the second matrix 304(2, 6, 10, 14), each of the individual partial products are added together to generate a second output product (i.e., a second "set" of partial products, a second "tile"). As illustrated, as another example, the second output product of the output matrix 306 would be "e2+f6+g10+h14". As part of the matrix multiply operation, the second output product would be placed in a tile (i.e., box) directionally "lower" and "diagonal" (i.e., "stair step" pattern) to the first output product in the result matrix 306.

Next, similar to how the first and second output products were generated, third and fourth output products (e.g., i3+j7+k11+l15 and m4+n8+o12+p16) may be generated from data elements of third and fourth rows of the first and second matrices 302, 304. Moreover, similar to as illustrated for this example (e.g., 4×4 matrix multiplication), each subsequent output product would continue to be placed in a tile of the result matrix 306 directionally diagonal to the prior output product. For instance, the third output product would be placed directionally diagonal to the second output product, and subsequently, the fourth output product would be placed directionally diagonal to the third output product.

As the illustrated N×N matrix multiplication is that of, for example, two 4×4 matrices, a first cycle of the operation would be completed at the end of the generation of the fourth output product. Specifically, this would signify that four output products, for example, complete a matrix multiplication of corresponding rows of the first and second matrices 302, 304, and a first "diagonal" of output products of the result matrix 306 would be "filled".

Figure 3D:
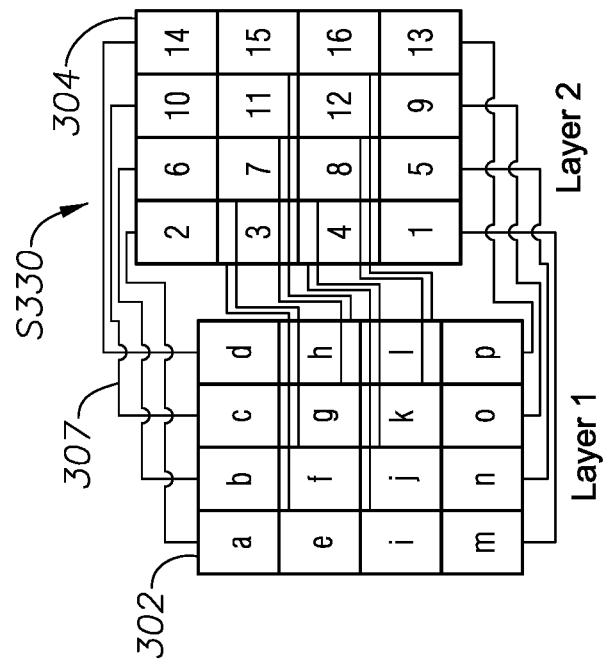
Figure 3C:
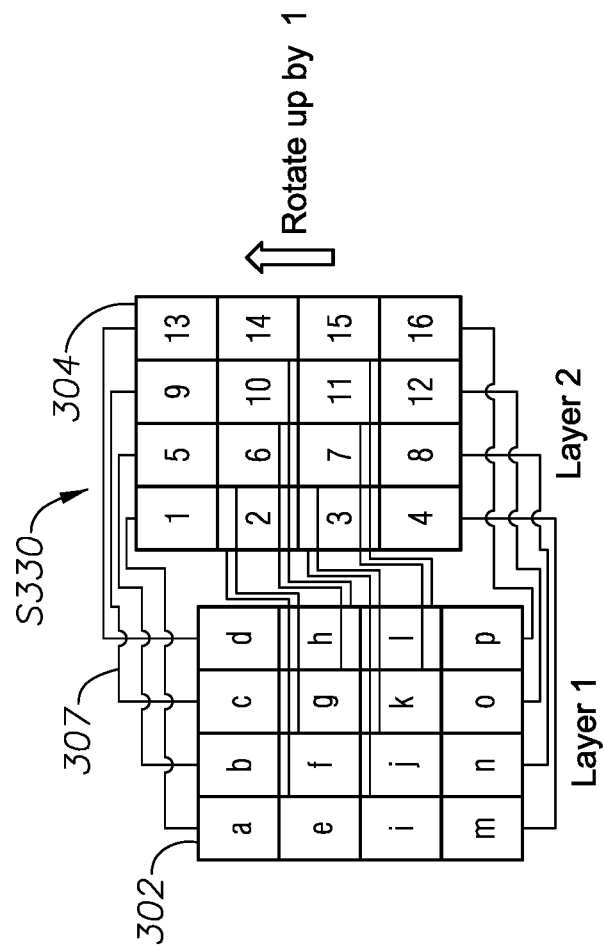

As shown in FIGS. 3C-3D, at step 330 (S330), in a second cycle (and for each subsequent "N" cycles) for the next set of diagonal output products, the operation includes spatially transforming the second matrix 304 by rotating "upward" (i.e., "shift up" one count) each row of second matrix 304 by one row. In doing so, the top row would go to the bottom of the second matrix 304.

After the second matrix 304 has been rotated, the next diagonal of output products would be obtained by matrix multiplication. Accordingly, and similar to step 320 (S320), in step 340 (S340), each respective data element of a first row (e.g., a-d) of the first matrix 302 would be multiplied by a corresponding respective data element (e.g., 2, 6, 10, 14) of a first row of the second matrix 304. For instance, data element 302(*a*) would be multiplied by data element 304(2) to produce a first partial product "a2", and so forth. Upon the matrix multiply of the first rows of the first and second matrices 302, 304, a first output product of the second cycle, a2+b6+c10+d14, would be placed in a directly adjacent tile of the first output product of the first cycle in the result matrix 306. Similarly, matrix multiply operations would be performed, for example, for each of the of the second (e.g., e3+f7+g11+h15) third (e.g., i4+j8+k12+l16), and fourth (e.g., m1+n5+o9+p13) output products of the second cycle, and each of these output products would be placed directionally diagonal (i.e., in a step pattern) in order from the first output product (e.g., a2+b6+c10+d14) of the second cycle forming a second diagonal of output products (i.e., a set of diagonal products). As can be appreciated, in the illustrated example of a 4×4 matrix, the fourth output product (e.g., m1+n5+o9+p13) of the second cycle would be placed in the "bottom left corner" tile of the result matrix 306.

Next, at step 350 (S350) (not shown), for the third cycle, another rotation upward by one row would be performed (i.e., an example spatial alignment, spatial 3D transformation) of the second matrix 304, and a similar matrix multiply operation would be conducted, at step 360 (S360), to generate a third diagonal of output products. As mentioned in above paragraphs, such a rotation would be performed for each cycle. Afterwards, at step 370 (S370) (not shown), for the fourth cycle, yet another rotation upward by one row would be performed, and at step 380 (S380) a similar matrix multiply operation would be conducted to generate a fourth diagonal of output products.

In the example, as shown in FIG. 3C-3E, the two example N×N matrices are 4×4 matrices. Hence, four cycles of matrix multiplication would be utilized to the generate the first through fourth diagonals comprising the full result matrix 308. Correspondingly, as well, for the general inventive case, for two N×N matrices, N cycles would be utilized to generate the completed result matrix (e.g., as shown in FIG. 306).

Figure 4:
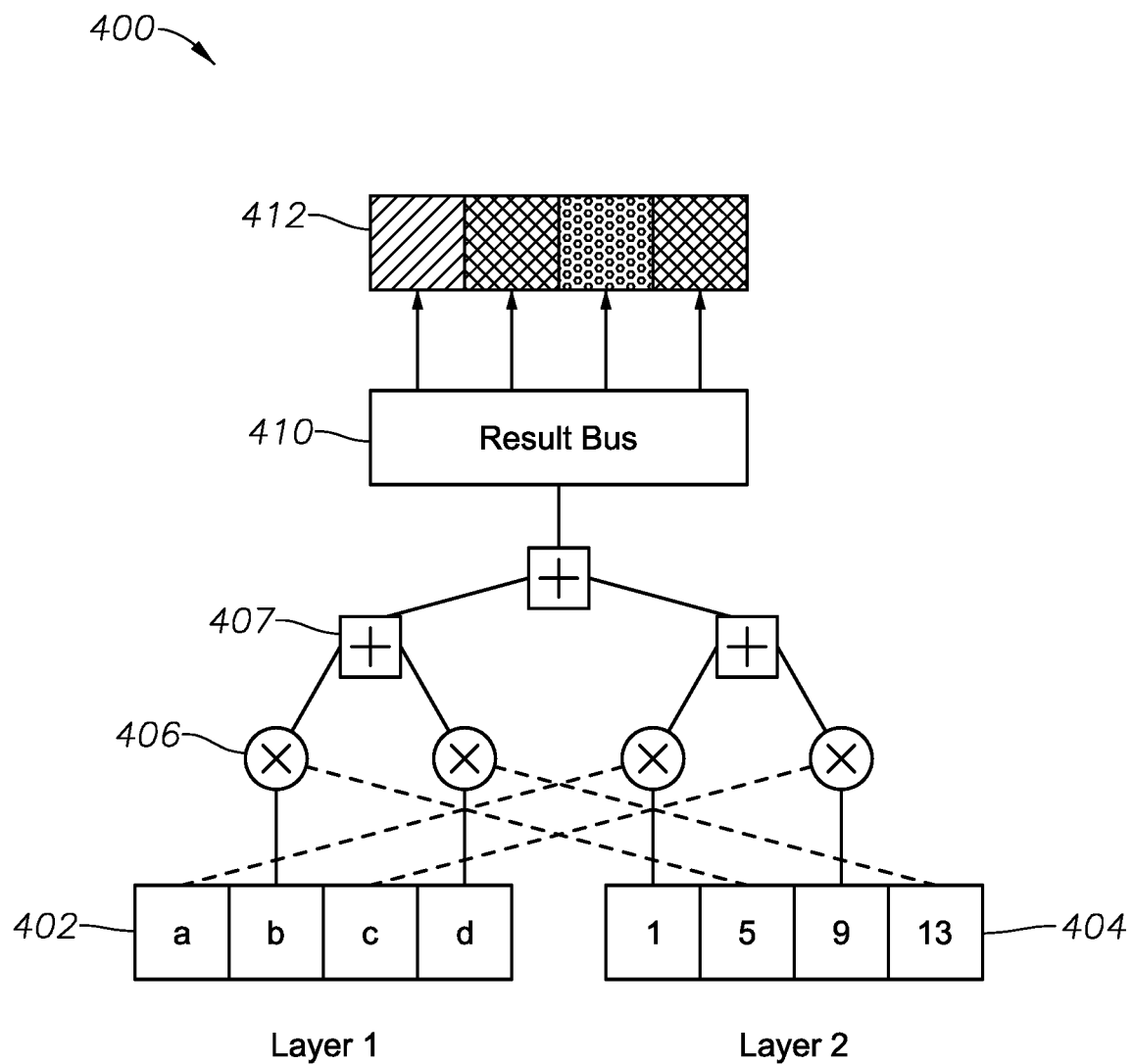
FIG. 4 is a schematic diagram of a portion of an example circuit in accordance with various implementations described herein.

Referring to FIG. 4, one example representation 400 of the compute circuitry 130 (as shown in FIG. 1) for the matrix multiplication 300 is shown. For one row "slice" (i.e., N blocks per matrix for two N×N matrices) (e.g., the combination of data elements a-d of the first data tier 302, and data elements 1, 5, 9, 13 of the second data tier 304), the hardware components includes: respective rows of the first and second matrices 402, 404 (i.e., first and second data tiers), multipliers 406 (i.e., multiplication circuitry), adders 408 (i.e., addition circuitry), and a result bus 410 (i.e., accumulation block, physical storage location of the output products of the result matrix 306). As shown, the result bus (i.e., accumulation block) 410 would transmit the output product to the to the correct placement "diagonal" 412 (of the result matrix 306). As depicted, for the general case, for each row, N multipliers and (N−1) two-input adders would be utilized. In certain cases, the physical hardware components may be organized in the three-dimension (3D), where such components can be split over two or more physical tiers (e.g., as shown in FIG. 4 as dashed-lines). As one example, when there are more than two data tiers, a result bus may be located, in whole or in-part, on the first or second data tiers, or on another tier altogether.

Advantageously, the circuitry provides for an efficient low data movement multiplier for any size N×N matrix (i.e., data layer, data tier) with its corresponding $N^2$ data connections. In operation, by multiplying the corresponding data elements of each data layer and adding the individual product "row-wise", the diagonal elements of the result matrix can be produced. Moreover, when repeating the same operation by rotating the second matrix by one row in each consecutive cycle, an entire matrix multiplication may be achieved in N cycles. Furthermore, such a configuration would also ensure full utilization of the $N^2$ multipliers and N "adder trees" utilized for the above-described operation.

Referring to FIGS. 5 and 6A-6F, a second implementation 500 and related methodology 600 of matrix multiplication according to inventive aspects is shown. Similar to the first implementation 200, the second implementation is also performed utilizing the circuit 100 in 3D. Advantageously, the second implementation would not require a mathematical "tree" structure for computation.

Figure 5:
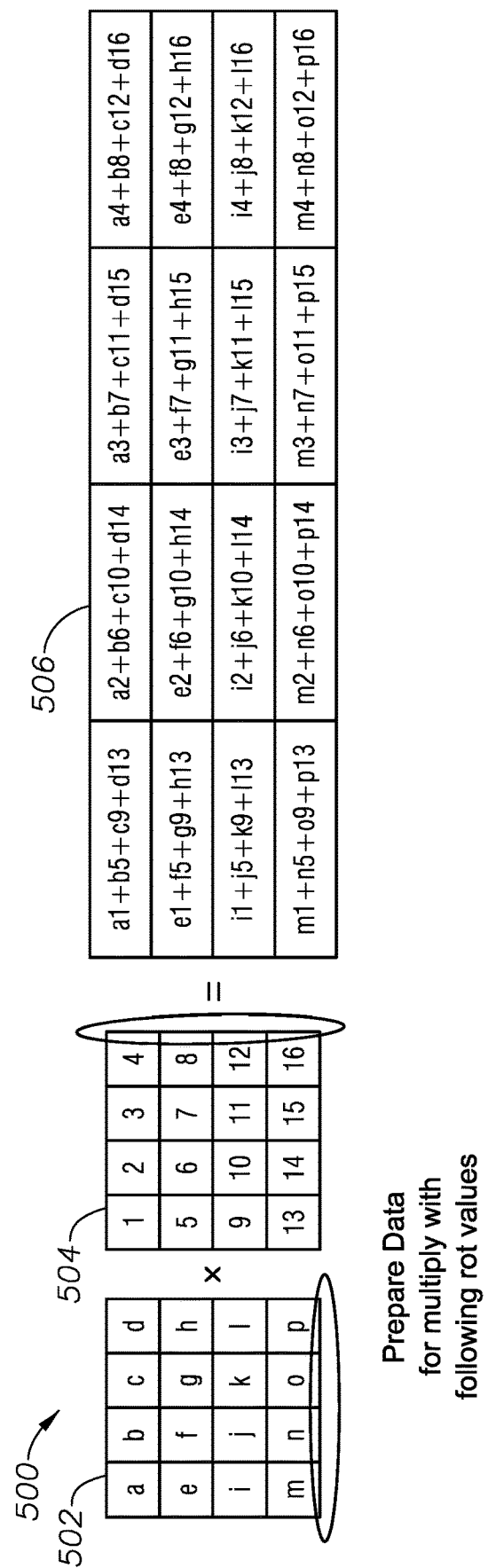
FIG. 5 is a schematic diagram of a representation in accordance with various implementations described herein.

As illustrated in FIG. 5, the second implementation 500 includes a similar initial setup as the first implementation 200 (as described with reference to FIG. 2). The representation 500 depicts two N×N matrices 502, 504 (e.g., 4×4 matrices as shown) (i.e., the initial starting point of the operation 600) and a result matrix 506 (i.e., the final result matrix of the operation 600). In certain implementations, the methodology 600 (as described with reference to one example in FIGS. 6A-6F) may be performed for any two or more N×N matrices, where N is a whole number and N multiplied by N would represent the total number of data elements per matrix (i.e., data layer), as well as the total number of "tiles" of the result matrix 506. In some implementations, the first N×N matrix 502 may correspond to the first data tier 110, and the second N×N matrix 504 may correspond to the second data tier 120.

Referring to FIGS. 6A-6F, a second matrix multiplication operation 600 is described. As depicted, the inventive methodology 600 utilizes a concurrent rotation of each row/"in-place accumulation" matrix multiplication scheme to obtain a completed result matrix 506.

Figure 6A:
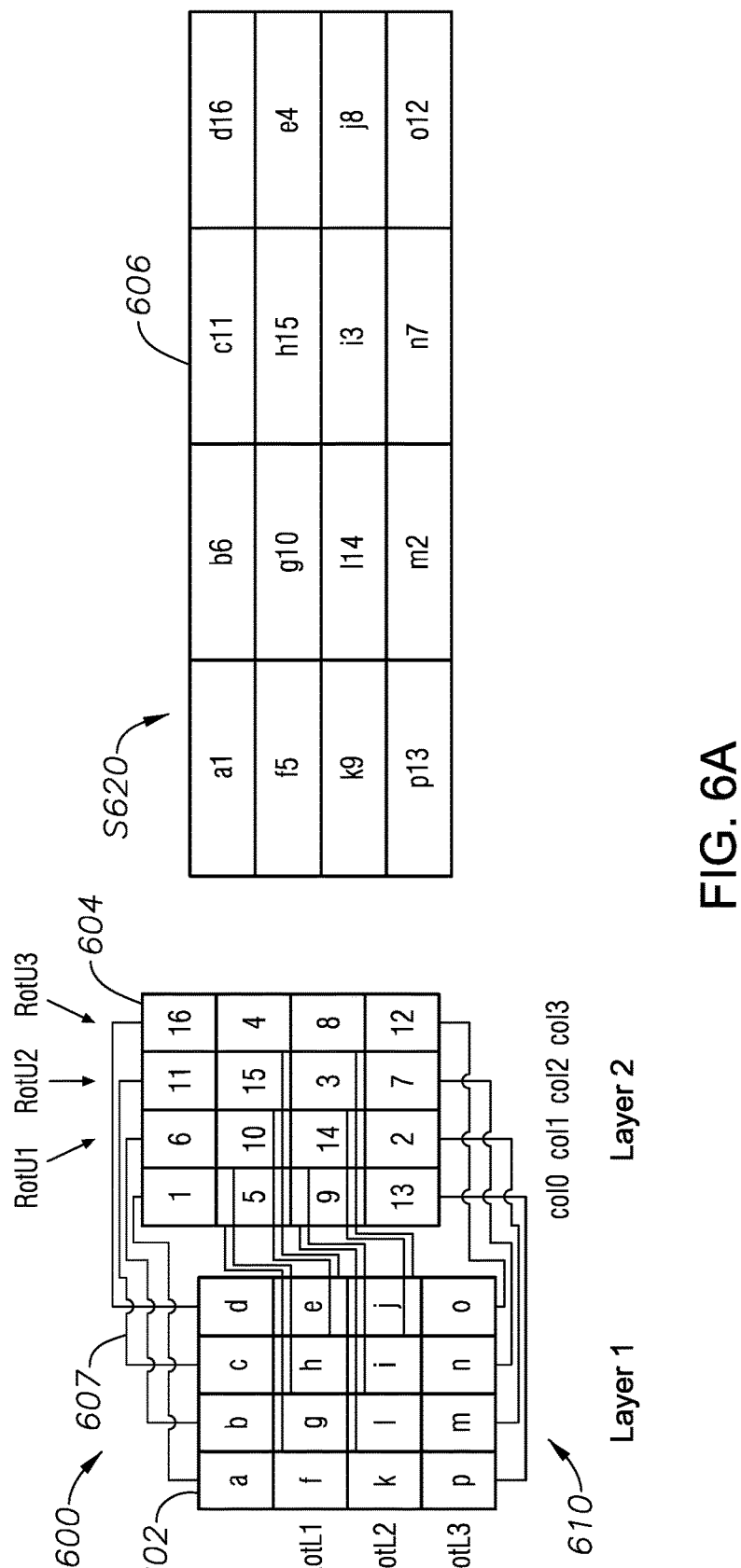

In FIGS. 6A-6F, for the example of two 4×4 matrices 602, 604, the first matrix 602 would include four rows (i.e., rows 0-4) and the second matrix 604 would include four columns (i.e., cols. 0-4). In various implementations, as may be appreciated, for N×N matrices, there would be N rows and N columns. In an example as shown in FIG. 6A, the first N×N matrix 602 (i.e., first data tier) is spatially aligned (i.e., a first special alignment, a first spatial transform) by concurrently rotating left (i.e., shift left) rows by its respective row index number (i.e., "i") and the second N×N matrix 604 (i.e., second data tier) is spatially aligned (i.e., a spatial transform) by concurrently rotating up (i.e., shift up) by its column index number (i.e., "j").

In an initial step, at step 610 (S610), to commence a first cycle, the first row (i.e., row 0) of the first matrix 602 and the first column (i.e., col. 0) of the second matrix 604 would remain unmoved. As the index number for both row 0 (i.e., "i=0") and column 0 (i.e., "j=0") is 0, the data element spatial alignment (i.e., shift left for rows and shift up for columns) would be to move 0 data elements. However, each subsequent row (row 1-3) of the first matrix 602 and subsequent column (col. 1-3) of the second matrix 604 would be concurrently rotated by its index number (e.g., sequentially by one data element in order). For example, data elements in row 1 (i.e., i=1) of the first matrix 602 would be rotated "left" (shift left) by one data element, data elements in row 2 (i.e., i=2) of the first matrix 602 would be rotated "left" (shift left) by two data elements, and data elements in row 3 (i.e., i=3) of the first matrix 602 would be rotated "left" (shift left) by three data elements.

Similarly, data elements in col. 1 (i.e., j=1) of the second matrix 602 would be rotated "up" (shift up) by one data element, data elements in col. 2 (i.e., j=2) of the second matrix 602 would be rotated "up" (shift up) by two data elements, and data elements in col. 3 (i.e., j=3) of the second matrix 602 would be rotated "up" (shift up) by three data elements.

Upon the completion of the spatial alignment (as shown in FIG. 6A), at step 620 (S620), utilizing the one or more one-to-one connections 607 (e.g., 16 individual one-to-one connections between two 4×4 matrices 602, 604 (i.e., first and second data tiers), multiplication operations are performed to obtain one of the N (e.g., 4 for two 4×4 matrices 602, 604) partial products of corresponding output product in respective tiles of the result matrix 606. For instance, in the first cycle, the multiplication of a first data element (e.g., a) of the first matrix 602 and a first data element (e.g., 1) of the second matrix 604 would result in a partial product "a1"; the first partial product of a first output product (located in a first tile) of the result matrix 606. In another example, the multiplication of a second data element (e.g., b) of the first matrix 602 and a second data element (e.g., 6) of the second matrix 604 would result in a partial product "b6"; the second partial product of a second partial product (located in a second tile) of the result matrix 606. This concurrent multiplication process would occur for each of the corresponding $N^2$ data elements of the first and second matrices 602, 604. Moreover, as illustrated in FIG. 6A, each of the particular partial products obtained due to multiplication corresponds to the positioning of data elements in the first and second matrices 602, 604.

Figure 6C:
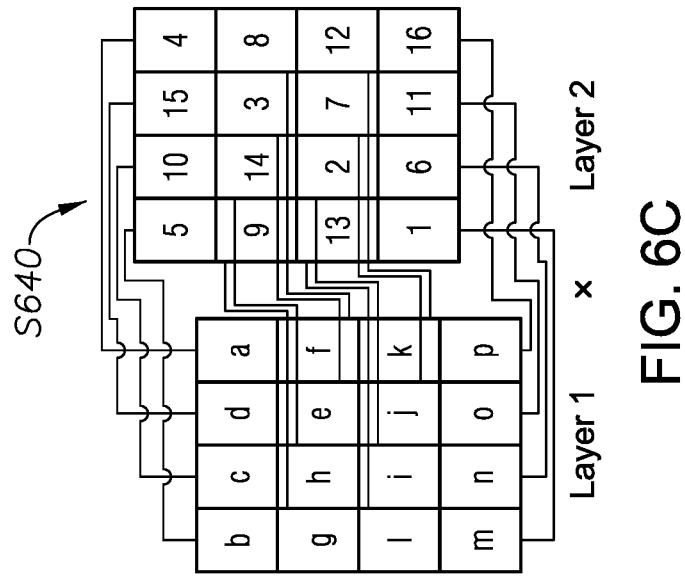
Figure 6B:
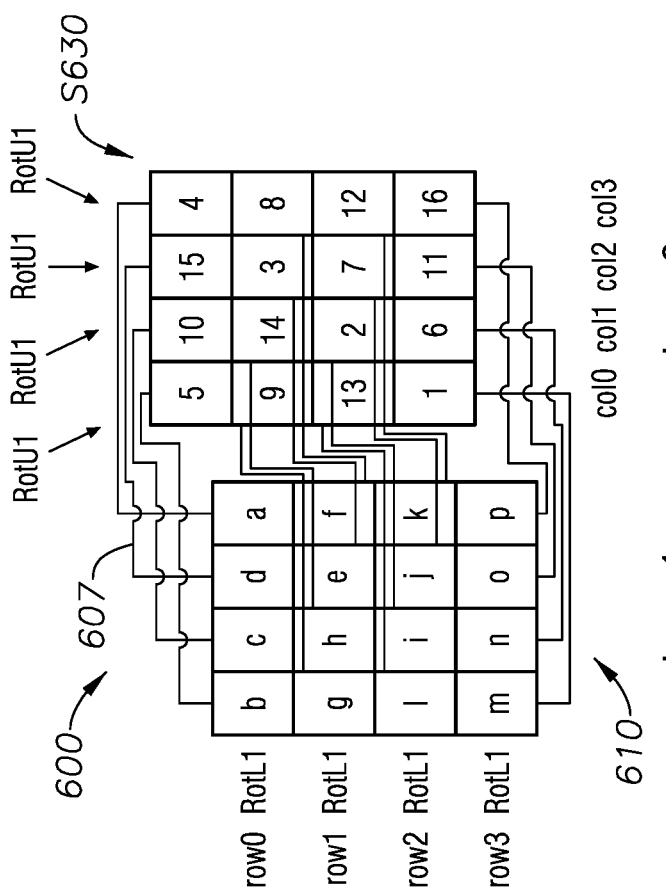

After obtaining one partial product for each of the tiles of the result matrix 606, in step 630 (S630) as shown in FIG. 6B, a second cycle commences and a second spatial alignment of the first and second matrices 602, 604 would be performed. In the second spatial alignment (and each subsequent spatial alignment for N cycles), each of the data elements of the first matrix 602 would be rotated to the left by one data element (i.e., RotL1 by one count) and each of the data elements of the second matrix 604 would be rotated up by one data element (i.e., RotU1 by one count).

Next, as step 640 (S640), again, while utilizing the one or more one-to-one connections 607 (e.g., 16 individual one-to-one to one connections between two 4×4 matrices 602, 604), multiplication operations are performed to obtain a second of the N (e.g., 4 for two 4×4 matrices 602, 604) partial products of corresponding output products in respective tiles of the result matrix 606. For instance, in the second cycle as shown in FIG. 6C-6D, the multiplication of a first data element (e.g., b) of the first matrix 602 and a first data element (e.g., 5) of the second matrix 604 would result in a partial product "b5"; the second partial product of the first output product (located in the first tile) of the result matrix 606. In another example, the multiplication of a second data element (e.g., c) of the first matrix 602 and a second data element (e.g., 10) of the second matrix 604 would result in a partial product "c10"; the second partial product of the second output product (located in the second tile) of the result matrix 608. In the second cycle, once again, this concurrent multiplication process would occur for each of the corresponding $N^2$ data elements of the first and second matrices 602, 604.

At step 650 (S650, not shown), in a third cycle, another spatial alignment would occur for the first and second matrices 602, 604. Namely, the first matrix 602 would again shift left by one data element and the second matrix 604 would again shift up by one data element. Next, at step 660 (S660), again similar multiplication operations would be performed to obtain a third of the N (e.g., 4 for two 4×4 matrices 602, 604) partial products of corresponding output products in respective tiles of the result matrix (shown in completion in the result matrix 506, 610).

Similarly, at step 670 (S670, not shown), in a fourth cycle, yet another spatial alignment would occur for the first and second matrices 602, 604. Again, the first matrix 602 would shift left by one data element and the second matrix 604 would again shift up by one data element. Afterward, at step 680 (S680), again similar multiplication operations would be performed to obtain a fourth of the N (e.g., 4 for two 4×4 matrices 602, 604) partial products of corresponding output products in respective tiles of the result matrix (shown in completion in the result matrix 506, 610). With reference to FIG. 6E, an example filled result matrix 610 (of the example matrix multiplication of first and second 4×4 matrices 602, 604) is shown. As one example, the result matrix 610 is output of matrix multiplication operations of two N×N matrices after N cycles (e.g., two 4×4 matrix multiplication operations).

Figure 7:
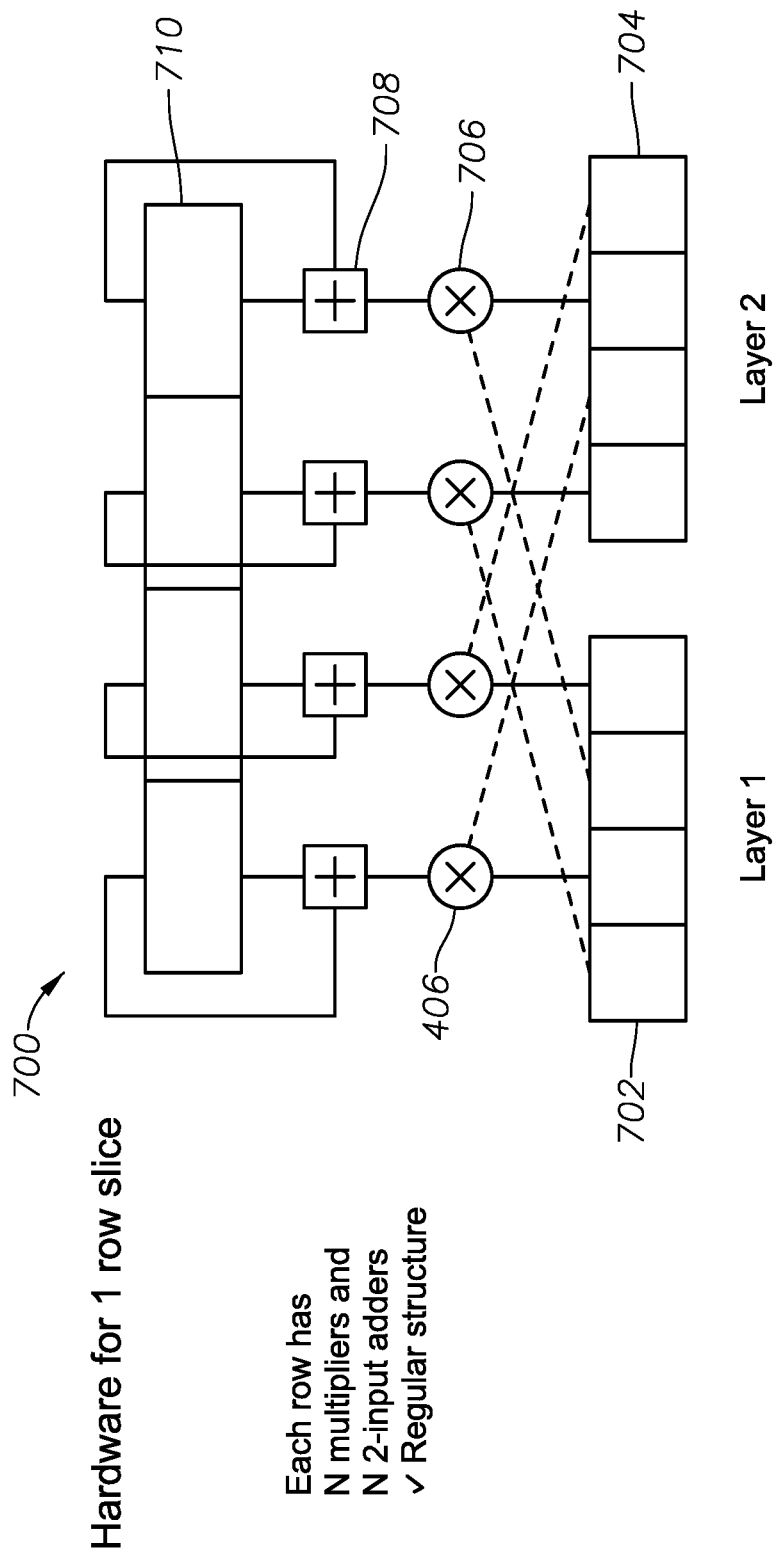
FIG. 7 is a schematic diagram of a portion of an example circuit in accordance with various implementations described herein.

Referring to FIG. 7, one example representation 700 of the compute circuitry 130 (as shown in FIG. 1) for the matrix multiplication 600 is shown. For one row "slice" (i.e., N blocks per matrix for two N×N matrices) (e.g., the combination of a first row of data elements of the first data layer 702, and a first row of data elements of the second data layer 704), the hardware components include: respective rows of the first and second matrices 702, 704; multipliers 706 (i.e., multiplication circuitry), adders 708 (i.e., addition circuitry), and a result bus 710 (i.e., accumulation block, physical storage location of the output products of the result matrix 506, 610). The result bus (i.e., accumulation block) 710 would transmit the output product to the to the correct placement of the result matrix 506, 610. As depicted, for the general case, for each row, N multipliers and N two-input adders would be utilized. In certain cases, the physical hardware components may be organized in the three-dimension (3D), where such components can be split over two or more data layers (e.g., as represented in FIG. 7 as dashed-lines) or be located on either layer or any other layer in cases where there are more than two data layers. As one example, when there are more than two data layers, a result bus may be located, in whole or in-part, on the first or second data layers, or on another layer altogether.

Figure 8:
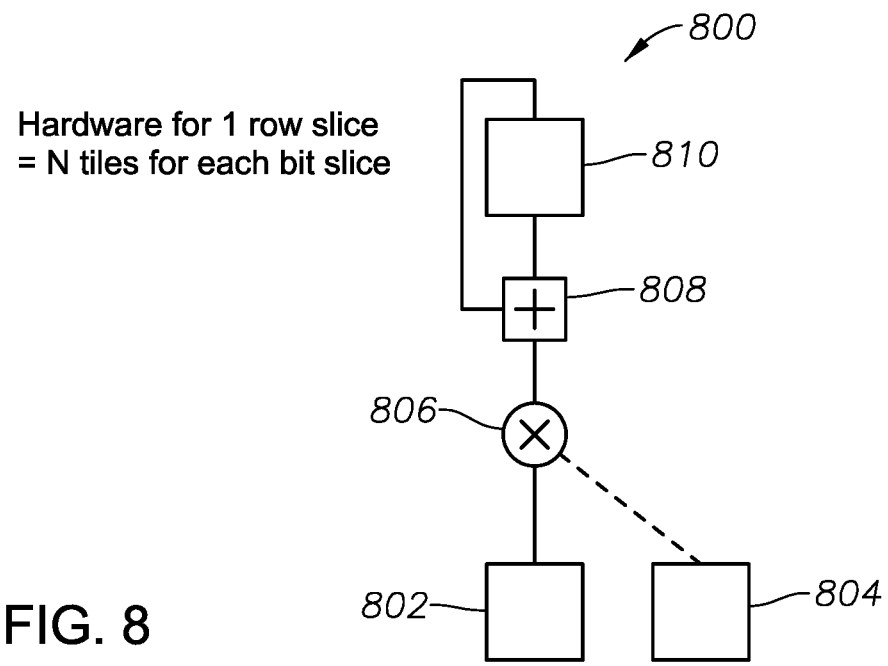
FIG. 8 is a schematic diagram of a portion of an example circuit in accordance with various implementations described herein.

Referring to FIG. 8, one example circuitry representation 800 of the compute circuitry 130 (as shown in FIG. 1) for the matrix multiplication 600 is shown. Corresponding to the hardware components in FIG. 7 for one "row slice", FIG. 8 illustrates hardware components required for one "bit slice" (i.e., one data element of a data layer). For instance, at a minimum, for one data element each of the first and second data layers 802, 804, one multiplier 806, one adder 808, and one tile of a result bus 810 can be utilized.

Advantageously, the circuitry representation 800 provides for N cycle rotation of first and second matrices (e.g., 602, 604) to obtain N×N multiplication. Similar to the implementation in FIG. 4, the circuitry 800 also allows for efficient low data movement multiplier for any size N×N matrix (i.e., data layer) with its corresponding $N^2$ data connections. In operation, by multiplying the corresponding data elements of each data layer and later adding the individual partial products of each tile, the in-place accumulation of the result matrix can be produced. Moreover, after an initial spatial alignment based on row and column index numbers (as described with reference to FIG. 6A) repeating an operation of shifting each row of the first matrix to the left by one data element, and shifting each column of the second matrix by one data element, for each successive cycle, an entire matrix multiplication may be achieved in N cycles. Furthermore, such a configuration would also ensure full utilization of the N multipliers and N two-input adders as utilized for the above-described operation.

Figure 9:
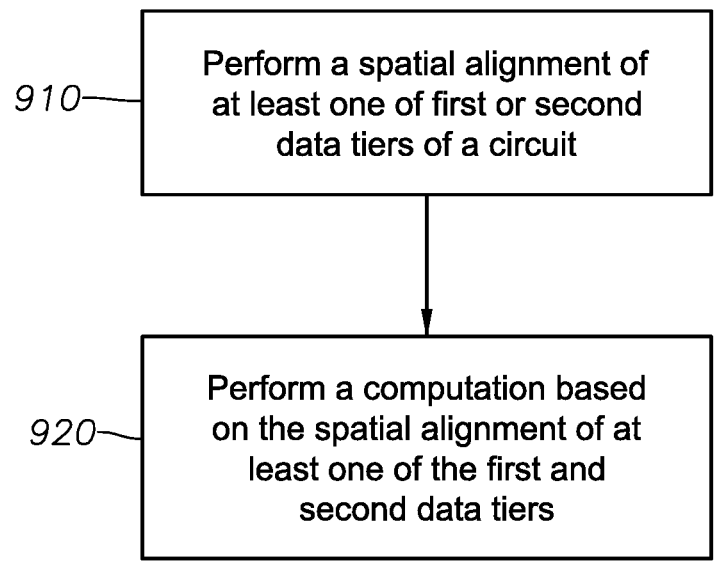
FIG. 9 is an operation method in accordance with various implementations described herein.

Referring to FIG. 9, a flowchart of an example method 900 (i.e., procedure) to perform 3D matrix multiplication is shown. Advantageously, in various implementations, the method 900 depicts operations of a multiple data layers (e.g., 110, 120, 202, 204; 302, 304; 402, 404; 502, 504; 602, 604; 702, 704; 802, 804). The method 900 may be implemented with reference to circuit implementations and operations as depicted in FIGS. 1-8.

At block 910, the method includes performing a spatial alignment of one or more of a first or second data tiers of a circuit. For instance, with reference to various implementations as described in with reference to FIGS. 1, 2, 3A-3F, 4, 5, 6A-6E, 7, 8, a spatial alignment (e.g., S310-S380, S610, S630, S650, S670) of one or more of a first or second data tiers (e.g., 110, 120; 202, 204; 302, 304; 402, 404; 502, 504; 602, 604; 702, 704; 802, 804) of a circuit (e.g., 100, 400, 700, 800) may be performed.

At block 920, the method includes performing a computation based on the spatial alignment of the at least one of the first and second data tiers. For instance, with reference to various implementations as described in with reference to FIGS. 1, 2, 3A-3F, 4, 5, 6A-6E, 7, 8, a computation (e.g., one or more matrix multiplications (e.g., S320, S340, S360, S380; S620, S640, S660, S680)) based on the spatial alignment (e.g., S310, S330, S350, S370; S610, S630, S650, S670) of at least one of the first and second data tiers (e.g., 110, 120; 202, 204; 302, 304; 402, 404; 502, 504; 602, 604; 702, 704; 802, 804).

Figure 10:
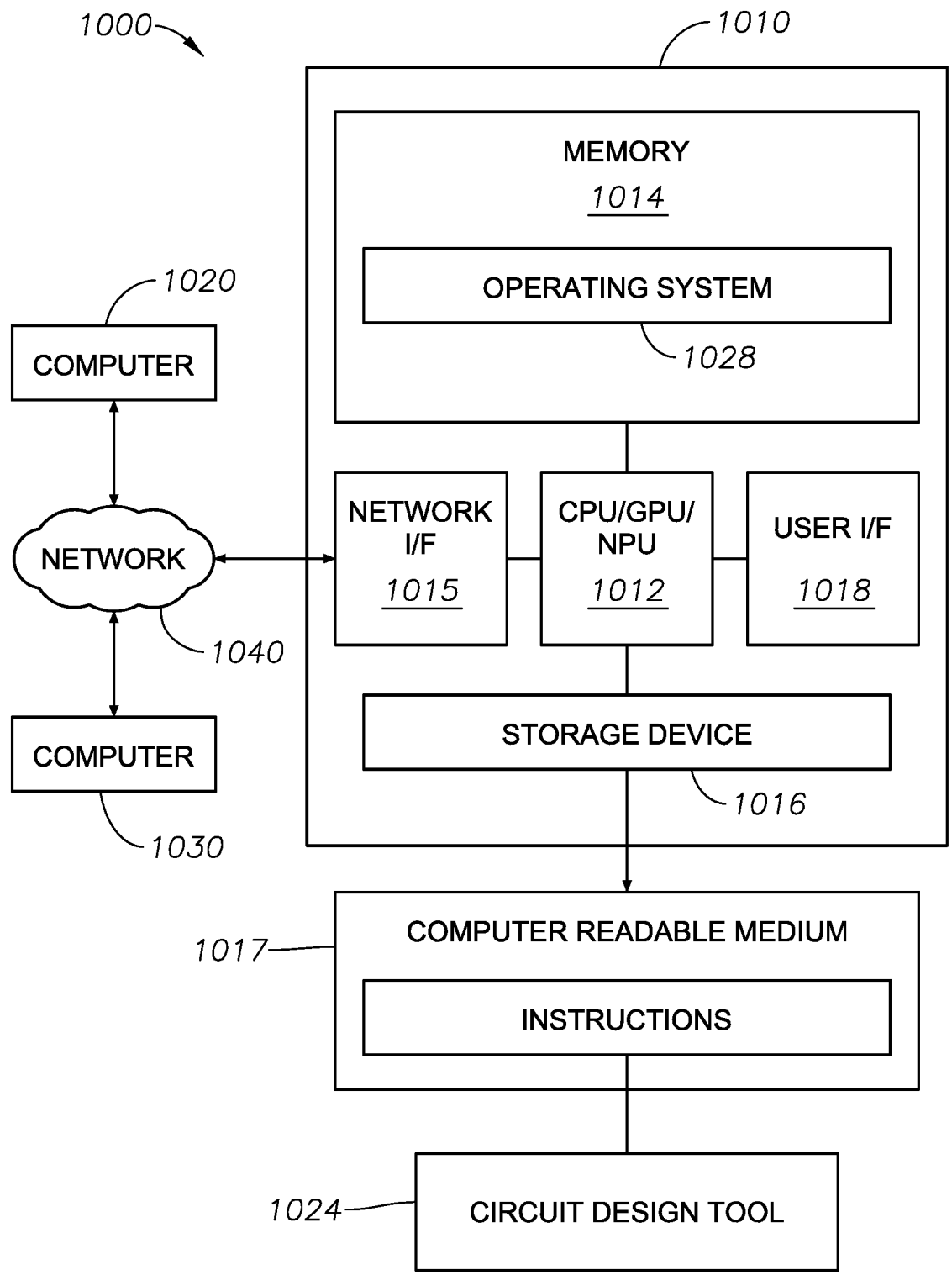
FIG. 10 is a block diagram in accordance with various implementations described herein.

FIG. 10 illustrates example hardware components in the computer system 1000 that may be used to perform 3D matrix multiplications and generate from outputs a results matrix. In certain implementations, the example computer system 1000 (e.g., networked computer system and/or server) may include a circuit design tool 1024 (i.e., spatial alignment and matrix multiplication tool) and execute software based on the procedure as described with reference to the method 900 in FIG. 9. In certain implementations, the circuit design tool 1024 may be included as a feature of an existing memory compiler software program allowing users to input $N^2$ number of data elements, and the type and/or methodology of spatial alignment and matrix multiplication to generate a results matrix in an accumulation block.

In some cases, the circuit design tool 1024 may provide generated computer-aided physical layout designs for memory architecture. The procedure (as described with reference to FIG. 9) may be stored as program code as instructions 1017 in the computer readable medium of the storage device 1016 (or alternatively, in memory 1014) that may be executed by the computer 1010, or networked computers 1020, 1030, other networked electronic devices (not shown) or a combination thereof. In certain implementations, each of the computers 1010, 1020, 1030 may be any type of computer, computer system, or other programmable electronic device. Further, each of the computers 1010, 1020, 1030 may be implemented using one or more networked computers, e.g., in a cluster or other distributed computing system.

In certain implementations, the system 1000 may be used with semiconductor integrated circuit (IC) designs that contain all standard cells, all blocks or a mixture of standard cells and blocks. In a particular example implementation, the system 1000 may include in its database structures: a collection of cell libraries, one or more technology files, a plurality of cell library format files, a set of top design format files, one or more Open Artwork System Interchange Standard (OASIS/OASIS.MASK) files, and/or at least one EDIF file. The database of the system 1000 may be stored in one or more of memory 1014 or storage devices 1016 of computer 1010 or in networked computers 1020, 1030.

The system 1000 may perform the following functions automatically, with variable user input: performance of spatial alignment (i.e., spatial transformation) of one or more data layers of a circuit; performance of a computation (e.g., matrix multiplication) based on the spatial alignment of the one or more of the first and second data layers; the generation of N×N matrices based on a user input of the number of N data elements; the determination of a type of spatial alignment including one or more of a matrix transpose operation, a rotation operation, a slide operation, or an align operation, a convolution, or a sliding window; and the determination in quantity and initial placement of data layers. In some instances, such functions may be performed substantially via user input control. Additionally, such functions can be used in conjunction with the manual capabilities of the system 1000 to produce the target results that are required by a designer.

In one implementation, the computer 1000 includes a processing unit 1012 having at least one hardware-based processor coupled to a memory 1014. In certain implementations, the processing unit 1012 may include one or more of a central processing unit (CPU), a graphical processing unit (GPU) or a neural processing unit (NPU). The memory 1014 may represent random access memory (RAM) devices of main storage of the computer 1010, supplemental levels of memory (e.g., cache memories, non-volatile or backup memories (e.g., programmable or flash memories)), read-only memories, or combinations thereof. In addition to the memory 1014, the computer system 1000 may include other memory located elsewhere in the computer 1010, such as cache memory in the processing unit 1012, as well as any storage capacity used as a virtual memory (e.g., as stored on a storage device 1016 or on another computer coupled to the computer 1010).

The computer 1010 may further be configured to communicate information externally. To interface with a user or operator (e.g., a circuit design engineer), the computer 1010 may include a user interface (I/F) 1018 incorporating one or more user input devices (e.g., a keyboard, a mouse, a touchpad, and/or a microphone, among others) and a display (e.g., a monitor, a liquid crystal display (LCD) panel, light emitting diode (LED), display panel, and/or a speaker, among others). In other examples, user input may be received via another computer or terminal. Furthermore, the computer 1010 may include a network interface (I/F) 1015 which may be coupled to one or more networks 1040 (e.g., a wireless network) to enable communication of information with other computers and electronic devices. The computer 1060 may include analog and/or digital interfaces between the processing unit 1012 and each of the components 1014, 1015, 1016, and 1018. Further, other non-limiting hardware environments may be used within the context of example implementations.

The computer 1010 may operate under the control of an operating system 1026 and may execute or otherwise rely upon various computer software applications, components, programs, objects, modules, data structures, etc. (such as the programs associated with the procedure 1000 and the method 900 and related software). The operating system 1028 may be stored in the memory 1014. Operating systems include, but are not limited to, UNIX® (a registered trademark of The Open Group), Linux® (a registered trademark of Linus Torvalds), Windows® (a registered trademark of Microsoft Corporation, Redmond, WA, United States), AIX® (a registered trademark of International Business Machines (IBM) Corp., Armonk, NY, United States) i5/OS® (a registered trademark of IBM Corp.), and others as will occur to those of skill in the art. The operating system 1026 in the example of FIG. 10 is shown in the memory 1014, but components of the aforementioned software may also, or in addition, be stored at non-volatile memory (e.g., on storage device 1016 (data storage) and/or the non-volatile memory (not shown). Moreover, various applications, components, programs, objects, modules, etc. may also execute on one or more processors in another computer coupled to the computer 1010 via the network 1040 (e.g., in a distributed or client-server computing environment) where the processing to implement the functions of a computer program may be allocated to multiple computers 1020, 1030 over the network 1040.

In example implementations, circuit diagrams and representations have been provided in FIGS. 1-8, whose redundant description has not been duplicated in the related description of analogous circuit diagrams and representations. It is expressly incorporated that the same layout diagrams with identical symbols and/or reference numerals are included in each of embodiments based on its corresponding figure(s).

Although one or more of FIGS. 1-10 may illustrate systems, apparatuses, or methods according to the teachings of the disclosure, the disclosure is not limited to these illustrated systems, apparatuses, or methods. One or more functions or components of any of FIGS. 1-10 as illustrated or described herein may be combined with one or more other portions of another of FIGS. 1-10. Accordingly, no single implementation described herein should be construed as limiting and implementations of the disclosure may be suitably combined without departing form the teachings of the disclosure.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. For example, the memory 614, the storage device 616, or both, may include tangible, non-transitory computer-readable media or storage devices.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method comprising:
performing a spatial transform from a first alignment to a second alignment of at least one of first or second data tiers of a circuit, wherein data elements of the first data tier and data elements of the second data tier are respectively coupled through a compute circuitry; and
performing, by the compute circuitry, a computation of the data elements of the first and second tiers based at least partially on the second alignment.

2. The method of claim 1, wherein:
each of the data elements of the first and second data tiers is spatially co-related; and
each spatial co-relation corresponds to the respective coupling of a respective data element of the first data tier and a respective data element of the second tier to one another and to the compute circuitry by a respective interconnect wiring.

3. The method of claim 1, wherein each of the at least first or second data tiers comprise an N×N matrix, wherein the N×N matrix comprises $N^2$ data elements, and wherein each of the $N^2$ data elements comprises one of at least one memory bit-cell, at least one sequential logic or at least one state holding element.

4. The method of claim 1, wherein the spatial transform is performed in a spatial Z-direction of a three-dimensional XYZ plane.

5. The method of claim 1, wherein the computation comprises a matrix-multiplication of the first and second data tiers, and wherein the matrix-multiplication comprises one or more multiplication and addition operations of the respective data elements of the first and second data tiers.

6. The method of claim 1, further comprising:
storing output values in at least one or more of the first and second data tiers of the circuit, or a third data tier of the circuit.

7. The method of claim 6, wherein the computation comprises a matrix-multiplication of the at least first and second data tiers, wherein the matrix-multiplication comprises one or more multiplication and addition operations of the respective data elements of the at least first and second tiers, and wherein the matrix multiplication is performed in one or more processing elements of the first, second, or third data tiers.

8. The method of claim 1, wherein the circuit comprises two or more data tiers, and wherein the spatial transform is performed on one or more of the two or more data tiers.

9. The method of claim 1, wherein the spatial transform comprises one or more of a matrix transpose operation, a rotation operation, a slide operation, a convolution, or a sliding window.

10. The method of claim 1, wherein the first and second data tiers comprise N×N matrices; wherein the spatial transform comprises rotating the second data tier by 90 degrees; and wherein the computation comprising a matrix multiplication is performed by:
for N cycles:
in a first cycle:
multiplying, by one or more multipliers, each of the respective data elements of the first and second data tiers to generate partial products;
adding, by one or more adders, each row of the generated partial products; and
storing, in an accumulation block, added rows diagonally of a resultant matrix-multiplication; and
in successive cycles until the completion of the Nth cycle:
rotate up by one count of each of the data elements of the second data tier;
multiplying, by the one or more multipliers, each of the respective data elements of the first and second data tiers to generate the partial products;
adding, by the one or more adders, each row of the generated partial products; and
storing, in an accumulation block, diagonal added rows of the resultant matrix-multiplication.

11. The method of claim 1, wherein the first and second data tiers comprise N×N matrices; wherein the spatial transform comprises concurrently rotating-left each data element of each row of the first data tier by a corresponding row index number, and concurrently rotating-up each data element of each column of the second data tier by a correspond column index number, and wherein the computation comprising a matrix multiplication is performed by:
for N cycles:
in a first cycle:
multiplying, by one or more multipliers, each of the respective data elements of the first and second data tiers to generate partial products;
adding, by one or more adders, each row of the generated partial products; and
storing, in an accumulation block, added rows of a resultant matrix-multiplication; and
in successive cycles until the completion of the Nth cycle:
sequentially rotate-left by one count each row of the data elements of the first data tier;
sequentially rotate-up by one count each column of the data elements of the second data tier;
multiplying, by the one or more multipliers, each of the respective data elements of the first and second data tiers to generate partial products;
adding, by the one or more adders, the generated partial products; and
storing, in an accumulation block, the generated partial products of the resultant matrix-multiplication.

12. A circuit comprising:
a compute circuitry; and
at least first and second data tiers of two or more data tiers positioned at least partially overlapping one another, wherein:
data elements of each of the at least first and second data tiers are respectively coupled to one another and to the compute circuitry, and
the positioning of the first and the second data tiers at least partially overlapping one another corresponds to a performed spatial transform.

13. The circuit of claim 12, wherein the at least first and second data tiers comprises a data element matrix, and wherein the data elements of the first and second data tiers are co-related.

14. The circuit of claim 13, wherein each data element of the data element matrix comprises one of at least one memory bit-cell, at least one sequential logic or at least one state holding element.

15. The circuit of claim 12, wherein respective three-dimensional electrical connections are configured to couple the compute circuitry to respective corresponding data elements of the first and second data tiers.

16. The circuit of claim 12, wherein the compute circuitry is configured to perform a matrix multiplication of the first and second data tiers.

17. The circuit of claim 16, wherein outputs of the matrix multiplication are stored in one or more of at least the first and second data tiers or a third data tier.

18. The circuit of claim 12, wherein the compute circuitry comprises one or more multipliers, one or more adders, and one or more accumulation blocks.

19. A computer-readable storage medium comprising instructions that, when executed by a processor, cause the processor to perform operations including:
- performing, by a circuit design tool, a spatial transform from a first alignment to a second alignment of at least one of first or second data tiers of a circuit, wherein the spatial transform comprises one or more of a matrix transpose, a rotation, a slide, a convolution, or a sliding window; and
- performing, by the circuit design tool, a computation based at least partially on the second spatial alignment.

* * * * *